United States Patent
Hendrickson et al.

(10) Patent No.: US 11,033,921 B2
(45) Date of Patent: Jun. 15, 2021

(54) SYSTEM FOR SPRAYING PLANTS WITH AUTOMATED NOZZLE SELECTION

(71) Applicant: Deere & Company, Moline, IL (US)

(72) Inventors: Larry L. Hendrickson, Grimes, IA (US); Noel W. Anderson, Fargo, ND (US); Thomas G. Mueller, Waukee, IA (US); Richard J. Connell, Slater, IA (US)

(73) Assignee: DEERE & COMPANY, Moline, IL (US)

( * ) Notice: Subject to any disclaimer, the term of this patent is extended or adjusted under 35 U.S.C. 154(b) by 692 days.

(21) Appl. No.: 15/797,501

(22) Filed: Oct. 30, 2017

(65) Prior Publication Data

US 2019/0126308 A1 May 2, 2019

(51) Int. Cl.
*G05B 15/02* (2006.01)
*B05B 12/12* (2006.01)
(Continued)

(52) U.S. Cl.
CPC .......... *B05B 12/124* (2013.01); *A01C 23/007* (2013.01); *A01M 7/006* (2013.01);
(Continued)

(58) Field of Classification Search
None
See application file for complete search history.

(56) References Cited

U.S. PATENT DOCUMENTS 4,823,268 A * 4/1989 Giles .................. A01M 7/0089
  239/77
4,844,346 A * 7/1989 Coffey ............... A01M 7/0042
  239/166
(Continued)

FOREIGN PATENT DOCUMENTS

KR  20100064252 A  6/2010
WO  2015154027 A1  10/2015

OTHER PUBLICATIONS

Miller, Mitchell A.; Steward, Brian L.; and Westphalen, Mark L. "Effects of Multi-Mode Four-Wheel Steering on Sprayer Machine Performance." Transactions of the American Society of Agricultural Engineers, 2004, vol. 47, No. 2, pp. 385-395.
(Continued)

*Primary Examiner* — Jason Lin
(74) *Attorney, Agent, or Firm* — McDonald Hopkins LLC; James P. Muraff

(57) ABSTRACT

A system for spraying plants comprises a location-determining receiver for estimating a position of a sprayer with respect to one or more rows of plants. A distance sensor is arranged to measure a distance between a nozzle assembly and a plant row segment. A guidance module is adapted to align the nozzle assembly with a target path between the rows of plants, such as a centered path between the rows, or offset between the rows of the plants. A first nozzle is targeted toward a first zone with respect to the plant row segment based on a first spray pattern of the first nozzle. A second nozzle is targeted toward a second zone with respect
(Continued)

to the plant row segment based on a second spray pattern of the second nozzle. A nozzle selection module for selecting automatically a first nozzle or a second nozzle based on maximum coverage of a target zone around the plant segment based on the first zone, the second zone, and the measured distance.

26 Claims, 6 Drawing Sheets

(51) Int. Cl.
*A01M 7/00* (2006.01)
*B05B 15/65* (2018.01)
*A01C 23/00* (2006.01)
*A01M 21/04* (2006.01)
*B05B 1/20* (2006.01)
*A01B 69/04* (2006.01)

(52) U.S. Cl.
CPC ........ *A01M 7/0089* (2013.01); *A01M 21/043* (2013.01); *B05B 1/20* (2013.01); *B05B 12/12* (2013.01); *B05B 15/65* (2018.02); *G05B 15/02* (2013.01); *A01B 69/008* (2013.01); *A01C 23/008* (2013.01)

(56) References Cited

U.S. PATENT DOCUMENTS

| | | | | |
|---|---|---|---|---|
| 5,278,423 A * | 1/1994 | Wangler | ............ | A01M 7/0089 250/559.4 |
| 5,337,959 A * | 8/1994 | Boyd | ................ | A01M 7/0089 239/127 |
| 5,516,044 A | 5/1996 | Thorstensson | | |
| 5,842,307 A * | 12/1998 | May | ................... | A01M 7/0057 47/1.7 |
| 5,921,019 A * | 7/1999 | Baek | ................... | A01M 7/0089 47/1.7 |
| 6,209,257 B1 * | 4/2001 | Nishimura | ........... | A01C 23/047 47/1.7 |
| 6,375,089 B1 * | 4/2002 | Taylor | ................ | A01M 7/0042 239/1 |
| 6,553,299 B1 * | 4/2003 | Keller | ................. | A01B 79/005 701/50 |
| 9,192,947 B1 * | 11/2015 | Haddock | ................. | B64D 1/18 |
| 2010/0032492 A1 * | 2/2010 | Grimm | .............. | A01M 7/0089 239/1 |
| 2010/0179734 A1 | 7/2010 | Schumann et al. | | |
| 2013/0126635 A1 * | 5/2013 | Klinefelter | .............. | B05B 12/08 239/76 |
| 2015/0027044 A1 * | 1/2015 | Redden | .................. | A01G 22/00 47/58.1 R |
| 2016/0178422 A1 * | 6/2016 | Humpal | ............. | A01M 7/0089 239/71 |
| 2016/0368011 A1 * | 12/2016 | Feldhaus | ............... | B05B 12/124 |
| 2017/0027103 A1 * | 2/2017 | Grotelueschen | ..... | A01C 23/047 |
| 2018/0242517 A1 * | 8/2018 | Davis | .................. | A01M 7/0014 |
| 2018/0338405 A1 * | 11/2018 | Connell | ............. | A01M 7/0082 |
| 2019/0029170 A1 * | 1/2019 | Wilger | ................ | H02K 11/215 |
| 2019/0075778 A1 * | 3/2019 | Barker | ................ | A01M 7/0042 |

OTHER PUBLICATIONS

Search Report issued in counterpart application No. EP18203185.6, dated Apr. 2, 2019 (7 pages).

* cited by examiner

SYSTEM FOR SPRAYING PLANTS WITH AUTOMATED NOZZLE SELECTION

FIELD

This disclosure relates to a system for spraying plants with automated nozzle selection.

BACKGROUND

Certain prior art sprayers may use a Y-drop sprayer configuration where two nozzles are arranged in an inverted Y to spray plants simultaneously in two adjacent rows. If the nozzles are fixed in position, the nozzles may not provide the sprayed liquid to target root zone or target foliage zone, where such zones can vary for application of nutrients versus other crop treatments, such as pesticide, herbicide, or fungicide. Accordingly, there is need for a system and method for spraying plants with automated nozzle selection.

SUMMARY

In accordance with one embodiment, a system for spraying plants comprises a location-determining receiver for estimating a position of a sprayer with respect to one or more rows of plants. A distance sensor is arranged to measure a distance between a nozzle assembly and a plant row segment (e.g., plant stem of a corresponding plant or a series of plant stems). A guidance module is adapted to align the nozzle assembly with a target path between the rows of plants, such as a centered path between the rows, or an offset path between the rows of the plants. A first nozzle is targeted toward a first zone with respect to the plant row segment (e.g., plant stem) based on a first spray pattern of the first nozzle. A second nozzle is targeted toward a second zone with respect to the plant row segment (e.g., plant stem) based on a second spray pattern of the second nozzle. A nozzle control module controls, activates or selects automatically a first nozzle or a second nozzle based on maximum coverage of a target zone around the plant row segment (e.g., plant stem or a series of plant stems) based on the first zone, the second zone, and the measured distance.

DETAILED DESCRIPTION

As used in this document, "adapted to" means programmed with software instructions, arranged to, or configured to perform a task, calculation, estimation, communication, or other function set forth in the document with a logic device, data processor or other electronic structure.

Figure 1:
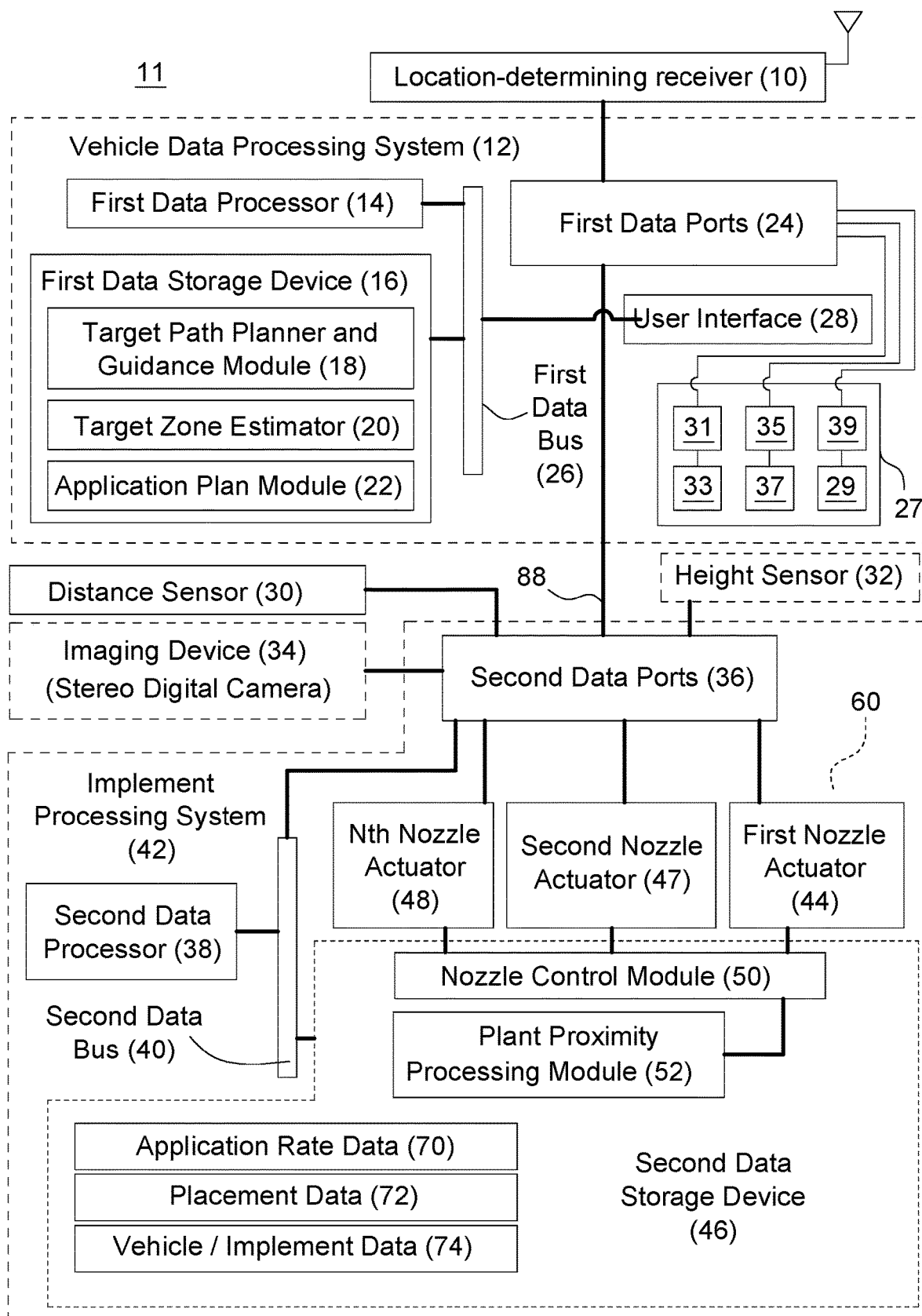
FIG. 1 is a block diagram of one embodiment of a system for spraying plants.

FIG. 1 is a block diagram of one embodiment of a system 11 for spraying plants. In one embodiment, the system 11 for spraying plants comprises a vehicle data processing system 12 and an implement data processing system 42. The vehicle data processing system 12 of FIG. 1 comprises a first data processor 14, a first data storage device 16, first data ports 24 and a user interface 28 coupled to a first data bus 26. The first data processor 14, the first data storage device 16, the data ports 24, and the user interface 28 can communicate with each other via the first data bus 26.

In one embodiment, a location-determining receiver 10 is coupled to at least one of the first data ports 24. A vehicle control system 27 is coupled to the first data ports 24 or the first data bus 26. For example, a steering controller 31, braking controller 35, and propulsion controller 39 may be coupled, directly to the first data ports 24, or indirectly to the vehicle data processing system 12 (or to the data ports) via a vehicle data bus 26. In turn, the steering controller 31 is connected to the steering system 33; the braking controller 35 is connected to the braking system 37; the propulsion controller 39 is connected to the propulsion system 29.

In one embodiment, the implement data processing system 42 comprises a second data processor 38, a second data storage device 46, and second data ports 36 coupled to a second data bus 40. The second data processor 38, the second data storage device 46, and the second data ports 36 can communicate with each other via the second data bus 40. In one embodiment, a distance sensor 30 (e.g., range sensor) and an optional crop height sensor 32 are coupled to the second data ports 36. In another embodiment, an optional imaging device 34 (e.g., stereo digital camera) is coupled to the second data ports 36. The optional crop height sensor 32 and the optional imaging device 34 are shown in dashed lines to indicate one or both are optional and may be deleted from certain configurations. In some configurations, the first data ports 24 and the second data ports 36 can communicate with each other via a communications line 88 or shared memory, for example.

The first data processor 14, the second data processor 38 or both comprise a microcontroller, a microprocessor, a digital signal processor, a programmable logic array, a logic device, an arithmetic logic unit, an application specific integrated circuit or another electronic processing device for inputting, outputting, processing or manipulating data.

The first data storage device 16, the second data storage device 46, or both comprises electronic memory, non-volatile random access memory, an optical disc, an optical storage device, a magnetic disc, a magnetic storage device, a hard drive or another mechanism for storing, accessing and retrieving data.

In one embodiment, first data storage device 16 stores a target path planner 18 and guidance module 19, a target zone estimator 20 and an application plan module 22. Each module may comprise software, electronic hardware, or both.

The target path planner 18 provides a path plan for the vehicle 61 or sprayer to following in a field, such as a plan to make passes or swaths in the field to cover an enter field area with minimum overlap of crop inputs or sprayed materials 101. For example, the target path planner 18 may establish a path plan for the vehicle 61 to follow with a location-determining receiver 10 and a vehicle guidance module 19. The vehicle guidance module 19 can send command data or command signals to the steering controller 31, the braking controller 35, and the propulsion controller 39 via one or more data ports 24 or via the vehicle data bus such that the vehicle 61 tracks a path plan.

In one embodiment, a steering controller 31, a braking controller 35 and propulsion controller 39 communicate to the first data ports 24 via communication lines or a vehicle data bus, such as controller area network (CAN) data bus. In turn, the steering controller 31 communicates with the steering system 33, such as an electrohydraulic steering system 33 or an electrical steering system 33. The vehicle guidance module 19 generates command data or command signals to send steering commands to the steering controller 31 to track the path plan, target heading or target yaw, such as a target path where one or more nozzle assemblies are substantially centered between adjacent plant rows or plant row segments. The vehicle guidance module 19 may use position data form the location-determining receiver 10 or the optional imaging device 34, or both.

The braking controller 35 is coupled to a braking system 37, such as an electrohydraulic braking system 37, an electrical braking system 37 or a mechanical braking system 37. The braking controller 35 is coupled to a first data port.

The propulsion controller 39 is coupled to a propulsion unit, such as one more electric drive motors, an internal combustion engine, or an internal combustion engine that provides rotational mechanical energy to a generator or an alternator that provides electrical energy to one or more electric drive motors. The propulsion controller 39 is coupled to a first data port 24.

In one embodiment, a target zone estimator 20 estimates a target zone for applying crop inputs or treatments for application to plants, plant rows, plant row segments, soil zones, or soil. For example, crop inputs comprise insecticides, herbicides, fungicides, pesticides, chemicals, nutrients, nitrogen, phosphorus, potash, chemicals, or aqueous solutions for applying to treat plants or the soil. Each target zone may be associated with a corresponding waypoint, a range of waypoints, a path segment, a point or geographic location, such as a plant or plant row segment, along the path plan of the sprayer or vehicle 61. In one embodiment, the target zone estimator 20 determines or implements the zones, concentration, and amount of crop inputs applied for each corresponding waypoint, point or geographic location along the path plan of the sprayer or vehicle 61, which in turn may determine the number of nozzles of a nozzle assembly 60 that are activated on the boom and the positions or sections of nozzles that are activated on the boom by nozzle actuators (44, 47, 48).

In one configuration, the target zone estimator 20 can select from one of several strips (e.g., by activing a particular nozzle in a vertical array of nozzles or a nozzle assembly 60) that are parallel to each plant row (e.g., a geometric centerline of each plant row or center point) to direct or apply the crop inputs toward a selected one of the several strips, for a corresponding segment of each plant row. As used in this document, a nozzle assembly 60 shall be synonymous with a nozzle head. In one embodiment, the nozzle assembly 60 can provides a target first zone, second zone and third zone based on whether the row unit is centered between adjacent plant row segments and the lateral row spacing (or row width) between adjacent plant row segments. In a first example, even if the lateral row spacing or row width varies or if the nozzle assembly is laterally offset from a center point between the adjacent rows, the nozzle assembly 60 can compensate by activating, separately or collectively, different nozzles in each vertical array to target different zones on each side or opposite sides of the nozzle assembly 60. In a second example, the target zone estimator 20 or the nozzle control module 50 activates nozzles of the nozzle assembly 60 directed toward the first zone for a corresponding narrow width row, a second zone for a corresponding medium width row, and a third zone for a corresponding wide width row, where the narrow width row has less distance between adjacent row segments than the medium width row or the wide width row.

In one embodiment, the application plan module 22 estimates the crop inputs that are applied for a certain field along with a lateral distance or offset between a nozzle assembly 60 or nozzle and one or more plant rows. The PPP module 52 may estimate the lateral position of the sprayer or wheels based on the position data from the location-determining receiver 10 or distance data from one or more distance sensors 30 associated with the row unit to provide a distance estimate between the plant row (e.g., plant row segment) and the row unit or nozzle assembly 60. In one embodiment, the nozzle control module 50 can decide which nozzle in a vertical array of nozzles to activate for a row unit for any given waypoint, plant or section of plants in a row. Each nozzle assembly 60 and its actuators (or any optional data processor or controller) can communicate with the second data processor 38 via cable 204 (e.g., wiring or communications line and power line) and one or more second data portions 36.

In conjunction with the distance sensor 30, the location-determining receiver 10, the imaging device 34, and the plant proximity processing (PPP) module 52 may estimate the distance between one or more nozzles (of the nozzle assembly 60) and a corresponding row or rows of plants. The PPP module 52 may comprise a lateral position estimator that can estimate whether a lateral position of the sprayer or its wheels, or tracks or centered in a plant row or offset with respect to the center of the plant row to provide more concentrated application of crop input to certain area of foliage or a strip of ground relative to the row of plants.

Figure 3:
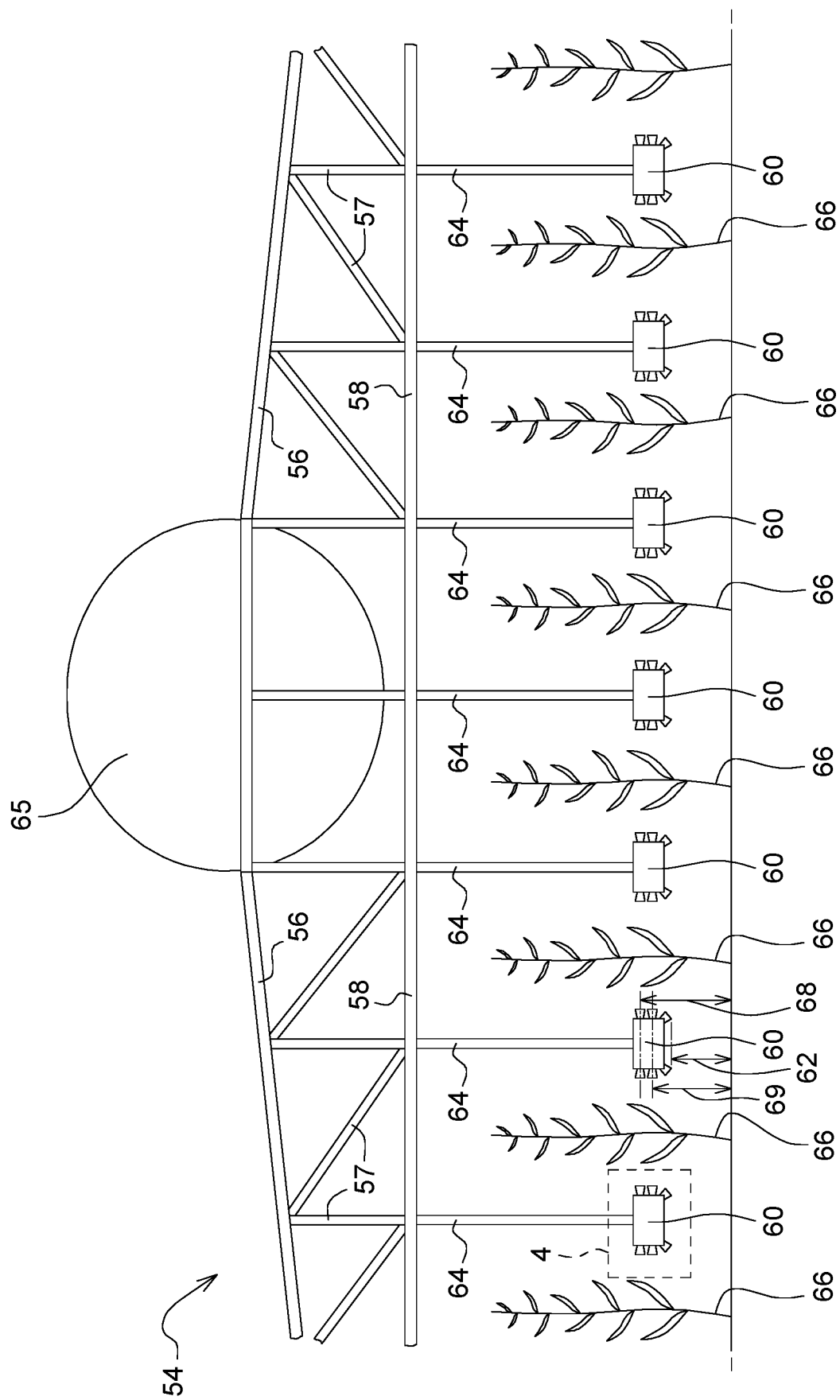
FIG. 3 is a rear view of the sprayer implement of FIG. 2 as viewed along reference line 3-3 of FIG. 2.
Figure 4:
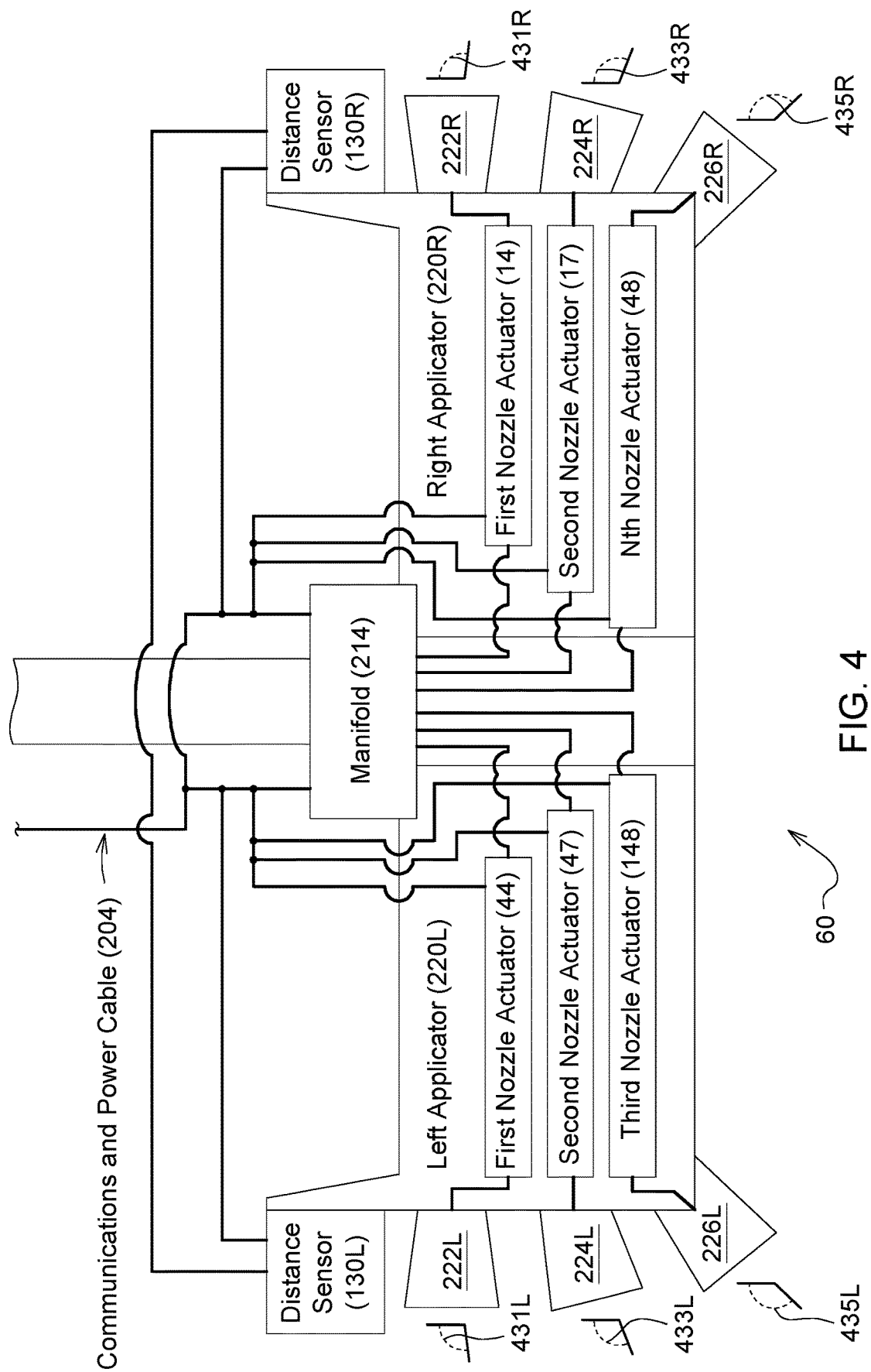
FIG. 4 is an enlarged view of the rectangular region 4 in FIG. 3, where the region includes a nozzle head.

In one embodiment, the distance sensor 30 may comprise an ultrasonic range finder, a laser range detector, an optical sensor that sends an ultrasonic signal, laser signal or optical signal, respectively, toward a plant row, a plant, a stalk, stem or trunk, a leaf canopy, or foliage to estimate or measure a lateral distance between a reference point on the boom or sprayer to the plant row, plant, leaf canopy, or foliage. For example, a laser range finder may comprise a light detection and ranging (LIDAR) device. In one embodiment, as illustrated in FIG. 3, or FIG. 4, the reference point may be aligned with a reference nozzle, a nozzle assembly 60 or a central point, such as central vertical axis of supply lines 64 to a nozzle assembly 60 (e.g., Y-drop nozzle assembly). In an alternate embodiment, the distance sensor 30 in FIG. 1 may comprise a stereo imaging device.

In one embodiment, one or more rows of the sprayer vehicle 61 are associated with one or more corresponding distance sensors (30 in FIG. 1, or 130R, 130L in FIG. 4); the second data processor 38 may process or average distance estimates or measurements for a sampling interval to attain a median, mean, or mode distance (between the nozzle assembly 60 and the plant row unit) in the aggregate for all of the rows and associated row units (e.g., nozzle assemblies 60) of the vehicle 61. In other embodiments, one or more rows of the sprayer vehicle 61 are associated with corresponding distance sensors (130L, 130R in FIG. 4). For instance, a pair of distance sensors (130L, 130R) on the row unit or nozzle assembly 60 face opposite directions from each other; each distance sensor (e.g., 30, 130L or 130R) is configured to measure a distance between the row unit and a proximate plant portion of a corresponding plant row segment that each distance sensor faces.

Figure 5:
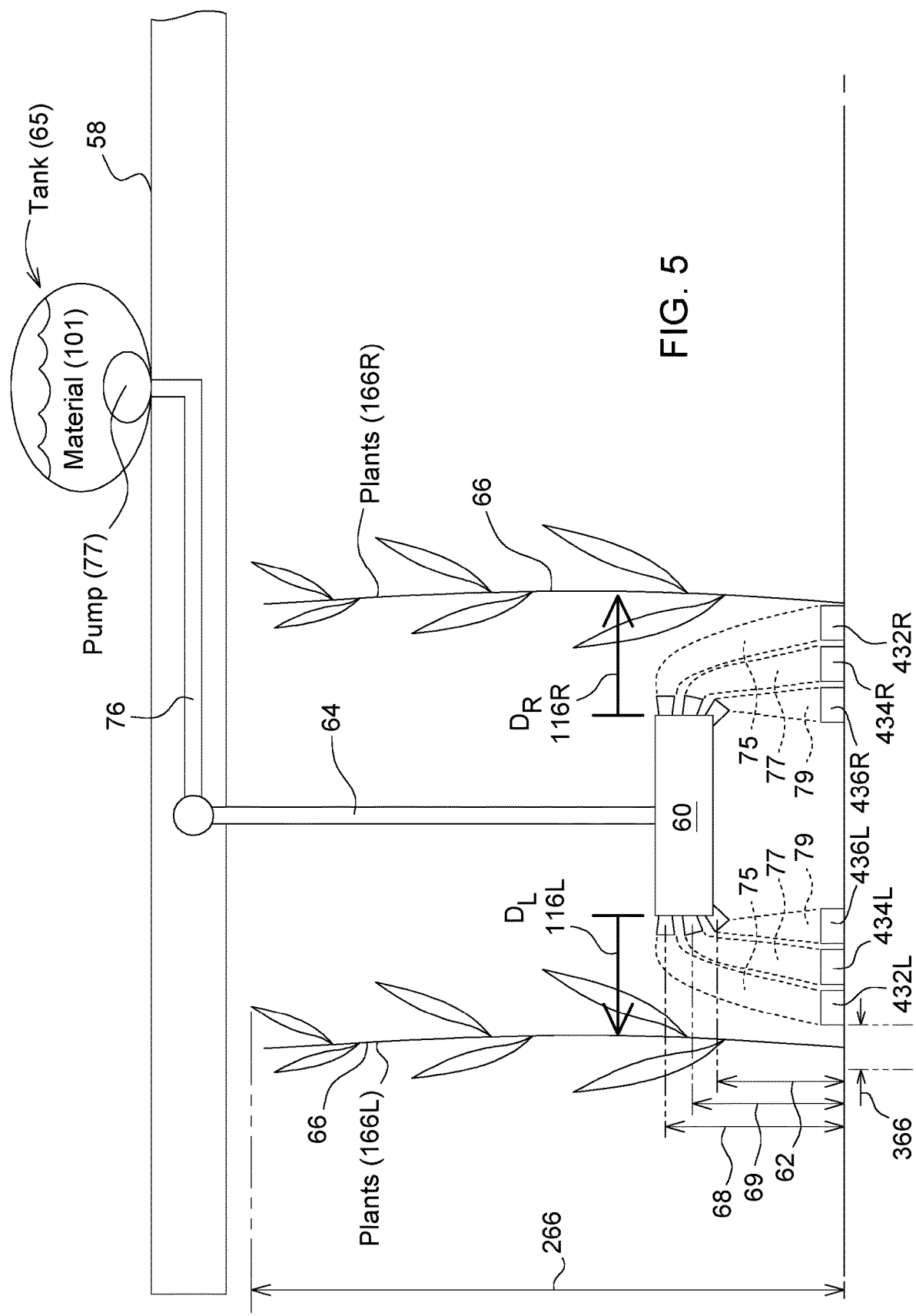
FIG. 5 illustrates a lateral separation or alignment of the nozzle head to adjacent rows of plants and target zones (e.g., target root zones) on the ground.

In one embodiment, as illustrated in FIG. 4 and FIG. 5, a set (e.g., pair) of first nozzles (222L, 222R) is associated with the row unit, where the first nozzles have corresponding first outlets facing different or opposite directions. Each of the first nozzles (222L, 222R) is directed toward a first zone (432L or 432R) with respect to the proximate plant portion of a corresponding plant row segment based on a first spray pattern 75 of each first nozzle (222L, 222R), where the set of first nozzles positioned above the second pair of nozzles in respective vertical arrays. A set (e.g., pair) of second nozzles (224L, 224R) is associated with the row unit or nozzle assembly 60, where the second nozzles (224L, 224R) have corresponding second outlets facing different or opposite directions. Each of the second nozzles (224L, 224R) is directed toward a second zone (434L or 434R) with respect to the proximate plant portion of a corresponding plant row segment based on a second spray pattern 77 of the second nozzle (224L, 224R). A set (e.g., pair) of third nozzles (226L, 226R) is associated with the row unit or nozzle assembly 60, where the third nozzles (226L, 226R) have corresponding third outlets facing different or opposite directions. Each of the third nozzles (226L, 226R) is directed toward a third zone (436L or 436R) with respect to the proximate plant portion of a corresponding plant row segment based on a third spray pattern 79 of the second nozzle.

Each nozzle assembly 60 for each row unit is controlled independently based on the corresponding distance measurement for its row that is measured by the distance sensor (30, 130L or 130R). A nozzle control module 50 selects or activates any two of the nozzles (222L, 224L, 226L, 222R, 224R, or 226R) of the nozzle assembly 60 based on maximum coverage of a target zone around the proximate plant portion of the one or more rows based on the first zone (432L, 432R), the second zone (434L, 434R), the third zone (436L, 436R) and the measured distance or measured distances that are measured by the distance sensor (30, 130L or 130R).

In one embodiment, an operator or user enters, via the user interface 28, an average, median or mode measurement of crop height samples taken in a field or portion of the field. The user interface 28 comprises one or more of the following: a display, a touch screen display, a keyboard, a keypad, and a pointing device (e.g., electronic mouse, touch pad or trackball).

In one embodiment, the optional height sensor 32 comprises an acoustic plant height sensor, an optical plant height sensor, a light detection and range (LIDAR) device, or a stereo vision imaging device. For example, an optical plant height sensor 32 may transmit particular frequency ranges of visible light, near infrared light and/or ultraviolet light at a plant row or plant from a fixed height on the sprayer or boom to generate a reflectance signal from the plant row or plant that is indicative of or proportional to the height of the plant row. Therefore, the plant height 266 can give some indication of the maturity of the plant or plant row and the corresponding root zone for a particular crop. For example, maize or corn plants at the VE to V5 growth stage of maturity may be more susceptible to fertilizer damage than plants at the V6 to VT growth stage; hence, the target zone for VE to V5 growth stage may be further from the plant 66 (e.g., plant stem) then the target zone for V6 to VT growth stage.

In one embodiment, the plant proximity processing module 52 estimates the distance, such as the average, mean or mode distance between one or more plant rows to nozzle assembly 60, reference nozzle or reference point for each sampling interval. Further, the plant proximity processing module 52 may store a look-up table, database or other data structure that defines the relationship between a lateral offset of the sprayer, the sprayer nozzle, or nozzle assembly 60 and a corresponding plant heights for a particular crop. In one configuration, the proximity processing module 52 or the data structure takes into consideration that the root zone of the plant or particular crop of a particular height may be associated with: (1) a lateral offset of the nozzle assembly 60 with respect to center point between adjacent plant rows, and/or (2) a vertical activation of one or more nozzles (222L, 224L, 226L or 222R, 224R or 226R) in vertical array of nozzles at different corresponding heights (68, 69, 62) above ground level, and different respective target zones with respect to plant row segments.

In one embodiment, nozzle control module 50 (e.g., nozzle selection module) determines whether to activate a first nozzle actuator 44, a second nozzle actuator 47, a third nozzle actuator 148, fourth nozzle actuator 144, a fifth nozzle actuator 147, and/or an Nth actuator 48, where N equals any positive integer or whole number greater than 2. The target zone estimator 20, the application plan module 22, and the plant proximity module 52, the first data processor 14, and the second data processor 38 may provide input to the nozzle control module 50 for selection of appropriate number, location, radiation pattern, pressure, or other parameters of activated or deactivated nozzles. The nozzle control module 50 may communicate with one or more actuators (44, 47, 148, 144, 147, 48) via the second data ports 36. However, in an alternate embodiment, the nozzle control module 50 may comprise an electronic controller (e.g. that is housed in the nozzle assembly 60 or separately from the second data storage device 46) and that is located between one or more second data ports 36 and the nozzle actuators (44, 47, 148, 144, 147, 48).

In one configuration, an optional imaging device 34 comprises a stereo vision imaging device or digital stereo vision camera with image data processing. The stereo images of the plants or plant rows can provide guidance information that used separately or cumulatively with location data or motion data from the location-determining receiver 10 to guide the vehicle 61 or sprayer relative to the plant rows, such as the lateral position (e.g., centered between adjacent rows of plants or offset) of the sprayer, implement, nozzle assembly 60 or nozzle within the plant rows. Further, the second data processor 38, alone or in combination with the second data storage device 46, comprises an imaging processing module 91 for applying image processing to the collected image data, such as color differentiation to distinguish background pixels from plant pixels. Background pixels may represent the ground, clouds, the sky or other background pixels, whereas the plant pixels may have some shade of green, flowers, fruit, seed pods, ears, or other plant foliage color consistent with a reference database or range of plant pixels for a particular crop type. The image processing module 91 may be adapted (e.g., programmed with software instructions) determine a cloud or constellation of data points of the plant pixels that represent plant height of the plant rows or plants.

In accordance with one embodiment, a method or system for spraying plants comprises a location-determining receiver 10 for estimating a position of a sprayer or vehicle 61 with respect to one or more rows of plants based on collected plant location data from a location-determining receiver 10, an imaging device 34, or other data source.

The collected plant location data can indicate a position of a respective row of plants. The collected plant location data can be estimated in accordance with various techniques, which may be applied separately or cumulatively. Under a first technique, during planting or seeding of the plant rows, a location-determining receiver (e.g., 10) on the planter, tractor or implement, provides an as-planted map of the plant rows or plant locations in one or more fields. For instance, the as-planted map may be stored in or transferred to (e.g., wirelessly transferred to) the first data storage device 16, the second data storage device 46 or in a data storage medium.

Under a second technique, the plant locations or plant locations can be defined by a series of points (e.g. geographic coordinates) that define substantially linear segments, curved segments, contours or spirals. Under a third technique, a planting plan for the planter provides a map of plant rows or plant locations in one or more fields that can be used by the location-determining receiver 10 and guidance system of the planter to plant the seeds or plants. Under a fourth technique, plant rows or plant locations can be defined by linear or quadratic equations that are bounded by field boundaries.

If a distance sensor (30, 130L or 130R) is not used or is not available, an optional imaging device 34 (in FIG. 6) can be arranged to measure a distance between a nozzle assembly 60 (e.g., nozzle head) and a plant 66 (e.g., plant stem) or a series of plants 66 (e.g., plant stems). A guidance module 19 is adapted to align the vehicle 61; hence, the nozzle assembly 60 with a target path between the rows of plants, such as a centered path between the rows, or a lateral offset between the rows of the plants. A first nozzle (222L or 222R) is targeted toward a first zone (432L or 432R, respectively) with a first lateral spacing with respect to the plant 66 (e.g., plant stem) or plant row segment based on a first spray pattern 75 of the first nozzle (222L or 222R).

A second nozzle (224L or 224R) is targeted toward a second zone (434L or 434R, respectively) with a second lateral spacing with respect to the plant 66 (e.g., plant stem) or plant row segment based on a second spray pattern 77 of the second nozzle. Further, a third nozzle (226L, 226R) is targeted toward a third zone (436L, 436R, respectively) with a third lateral spacing with respect to the plant 66 (e.g., plant stem) based on the third spray pattern 79 of the third nozzle (226L, 226R).

In one configuration, the first nozzle (222L, 222R) may have a greater height 68 above ground than a height 69 of the second nozzle (224L, 224R). The first nozzle (222L, 222R) and the second nozzle (224L, 224R) may be arranged in a substantially vertical array, such as a left vertical array (or left applicator 220L) on a left side of the nozzle assembly 60 or a right vertical array (or right applicator 220R) on a right side of the nozzle assembly 60.

In another configuration, each nozzle assembly 60 has a left vertical array of nozzles (e.g., first nozzle 222L, second nozzle 224L and third nozzle 226L) and a right vertical array of nozzles (e.g., first nozzle 222R, second nozzle 224R and third nozzle 226R). A first nozzle set comprises a pair of upper nozzles or first nozzles (222L, 222R) on the row unit or nozzle assembly 60 facing opposite directions toward a left first zone 432L and a right first zone 432R associated with adjacent rows of plants. A second nozzle set comprises a pair of intermediate nozzles or second nozzles (224L, 224R) on the row unit or nozzle assembly 60 facing opposite directions toward a left second zone 434L and a right second zone 434R. Further, a third nozzle set comprises a pair of lower nozzles or third nozzles (226L, 226R) on the row unit or nozzle assembly 60 facing opposite directions toward a left third zone 436L and right third zone 436R.

In one embodiment, the first nozzle (222L, 222R) comprises an upper nozzle at an upper height 68 above the ground and wherein the second nozzle (224L, 224R) comprises an intermediate nozzle at an intermediate height 69, respectively) above the ground. In an illustrative example, the upper nozzle or first nozzle (222L, 222R) is directed at a first down-tilt angle 431 with respect to the vertical axis toward the first zone (432L, 432R) the intermediate nozzle or second nozzle (224L, 224R) is directed at a second down-tilt angle 433 with respect to a vertical axis toward the second zone (434L, 434R). In one embodiment, a lower nozzle or third nozzle (226L, 226R) is at a lower height above ground below the intermediate nozzle, wherein the lower nozzle is directed at a third down-tilt angle 435 with respect to a vertical axis toward a third zone (436L, 436R).

A nozzle control module 50 is adapted to control, select, or activate automatically one or more of the nozzles of the nozzle assembly 60 based to cover the first zone (432L, 432R), the second zone (434L, 434R), or both as a target zone for the plant row segment based on the measured distance. For example, the nozzle control module 50 is adapted to control, select or activate any permutation or combination of a first nozzle (222L, 222R), a second nozzle (224L, 224R) and/or a third nozzle (226L, 226R) based on maximum coverage (with a sprayed crop input) of a target zone around the plant 66 (e.g., plant stem), a plant row, or a series of plants 66 (e.g., stems) based on the first zone (432L, 432R), the second zone (434L, 434R), the third zone (436R, 436L) and the measured distance (116L, 116R). In some configurations, the first zone (432L, 432R), second zone (434L, 434R) and third zone are configured as strips that are parallel to each other and with respect to one or more plant rows, where the first zone (432L, 432R), second zone (434L, 434R) and third zone (436R, 436L) are associated with a corresponding plant row.

In another embodiment, the nozzle control module 50 (e.g. nozzle selection module) controls or selects the nozzle assembly 60. The nozzle control module 50 may comprise an electronic controller. In particular, the nozzle control module 50, the plant proximity module 52, or both may comprise electronic devices that are separate from the second data storage device 46 and that are not stored in the second data storage device 46. For example, the nozzle control module 50 controls or selects the nozzle based on one or more measured distances (116L, 116R) and user input of the crop input, such as whether the crop input comprises a nutrient or a non-nutrient application, where the target zone for nutrient crop inputs is directed toward a ground zone with reference to the plant 66 (e.g., plant stem) and wherein the target zone for non-nutrient crop inputs is directed toward a foliage zone with respect to the plant 66 (e.g., plant stem) or plant foliage.

In one embodiment, an optional plant height sensor 32 or imaging device 34 may estimate the height of the plant or segment of a row of plants, which can be assigned one or more target zones or foliar target zones. Alternately, the user may enter, via the user interface 28, the average or mean plant height in a field or from a prior survey of a field by an unmanned aerial vehicle 61.

In another embodiment, the nozzle control module 50 selects one or more active nozzles on the nozzle assembly 60 based on at least one of the measured distance (116L, 116R), an observed height (68, 69, 62) of the nozzle with respect to ground and any offset between the nozzle assembly 60 with respect to a target path between the rows of plants. Alternately, the user may input the observed height (68, 69, 62) of the nozzle with respect to the ground or input a sprayer vehicle 61 make and model number that is associated with such observed height information (68, 69, 62).

In another embodiment, the nozzle control module 50 (e.g., nozzle selection module) selects one or more nozzles on the nozzle assembly 60 based on at least one of the measured distance (116R, 116L), an observed location of the sprayer in the field, and any offset between the nozzle head with respect to a target path between the rows of plants. In one example, the nozzle control module 50 can reduce the lateral width of the spray pattern on demand for a particular crop row segments with normal than targeted row width (between two adjacent crop rows) to provide uniform application of fertilizer to crop rows or to apply fertilizer in accordance with differential application requirements. Similarly, in another example, as the sprayer vehicle 61 makes turns or headland turns, as sensed by a change in the heading or yaw rate of the vehicle 61 from the location-determining receiver 10, inertial measurement unit of the location-determining receiver 10, or accelerometer (e.g., of the location-determining receiver 10), the second data processor 38 or the nozzle control module 50 can reduce dynamically the lateral width of the spray pattern on demand to avoid overspray or unwanted application of fertilizer, unwanted application of herbicide, or crop inputs that might damage crops or other vegetation. A change in the heading, a mathematical derivative of the heading, or yaw rate or accelerometer data can be indicative of a turn of the sprayer vehicle 61, for instance.

In one embodiment, a target path comprises a centered path between adjacent ones of the rows where distances measured by the pair of distance sensors 30 are approximately equal and where the nozzle control module 50 selects or activates (simultaneously) via one or more actuators the pair of first nozzles (e.g., right upper nozzle 222L and left upper nozzle 222R) or the pair of the second nozzles (e.g., right lower nozzle 226L or right intermediate nozzle 224L, and left lower nozzle 226R or left intermediate nozzle 224R). The target path comprises an offset path between adjacent ones of the rows where distances measured by the pair of distance sensors (30, 130L, 130R) are different by at least a minimum threshold and wherein the nozzle selection module selects or activates one of the first nozzles (222L, 222R) and one the second nozzles (224L, 224R) such that the different zones (e.g., strips on the soil or on the plant row segments) are substantially targeted for adjacent rows of the plants.

The nozzle control module 50 is adapted to select or activate nozzles on the row units or nozzle assemblies 60 independently from the other row units (or in synchronization or coordination with the other row units on the implement) based on the measured distances from the corresponding pair of distance sensors (30, 130L, 130R) and based on the location of the sprayer in the field. For example, the nozzle control module 50 is adapted to select or control the nozzles on the row unit such that there is compensation in the spray patterns for growth variation in the rows of plants or variation or error in the as-planted spacing between adjacent rows of plants. For example, the compensation in the spray patterns can account for guess rows or errors in adjacent passes or swaths of planters, for manually driven planting, or for planting without use of precise position data from a satellite navigation receiver 10.

As used in this document, the proximate plant portion comprises a closest or nearest plant stem (66 166L, 166R) in a row of crop. In one configuration, the first zone (432L, 432R) and second zone (434L, 434R) comprise adjacent bands or strips on the ground near the proximate plant portion. Further, a third zone (436L, 436R), which comprises a central zone closest to the center point or centerline, between adjacent plant row segments may be adjacent band or strip to the second zone. Although in some configurations there is no or minimal overlap between the first zone (432L, 432R) and the second zone (434L, 434R), or between the second zone and third zone (436L, 436R), in other configurations there may be overlap between any two zones.

In one configuration, the first data processor 14 and the user interface 28 facilitate proper control of the spray patterns (75, 77, 79) from each nozzle assembly 60. As noted, a first data processor 14 is capable of communication with the guidance module and a user interface 28 is coupled to the first data processor 14. Data may be inputted into the user interface 28 in accordance with various examples, which may be applied separately or cumulatively. In first example, the user interface 28 supports entry of the crop input and ancillary data including any of the following: (1) whether the crop input comprises a nutrient or a non-nutrient application, and (2) if the crop is for nutrient application, the growth stage, planting date 83 or height of the crops or plants. In second example, the user interface 28 supports entry of the average, median, or mean plant height in a row, field or zone of crop, or the average, median or mean lateral width or span of the leaf canopy of the plant in a row, field or zone of crop. In a third example, a user interface 28 is coupled to the first data processor 14, the user interface 28 supporting entry of observed height of the nozzle with respect to the ground or input a sprayer make and model number that is associated with such observed height information.

Based upon one or more of the examples of data inputted into the user interface 28, the first data processor 14 or the nozzle control module 50 may adjust the target zone for nutrient crop inputs to be directed toward a certain zone (e.g., first zone (432L, 432R), second zone (434L, 434R), third zone (436L, 436R) or ground zone) with a corresponding lateral separation distance 366 with reference to the plant 66 (e.g., plant stem). Similarly, the first data processor 14 may direct the target zone for non-nutrient crop inputs to be directed toward a foliage zone with respect to the plant stem (66, 166L, 166R) or plant foliage.

In one embodiment, a first distance sensor (30 or 130L) on a first side of the row unit estimates a first estimated distance between the row unit and a first plant or first row of plants. In addition, a second distance sensor (30 or 130R), on a second side of the row unit opposite the first side, estimates a second estimated distance between the row unit and second plant or second row of plants. Accordingly, nozzle control module 50 is adapted to select different ones of the nozzles, on opposite sides of the row unit if the first estimated distance differs from the second estimated distance.

In an alternate embodiment, a plant height sensor 32 or imaging device 34 is adapted to estimate a plant height 266 of the plants in plant rows, which can be assigned one or more corresponding target zones or foliar target zones. In turn, the second data processor 38 or the nozzle control module 50 selects or activates one or more nozzles (222L, 224L, 226L, 222R, 224R, 226R) via a corresponding actuators (44, 47, 148, 144, 147, 48, respectively) based on at least one of the measured distance, an observed height (62, 69, 68) of the nozzle with respect to ground, the observed position of the sprayer vehicle 61, and any lateral offset between the nozzle assembly 60 with respect to a target path (e.g., center point or center line, spaced equidistantly to each plant row stem) between the rows of plants.

Figure 2:
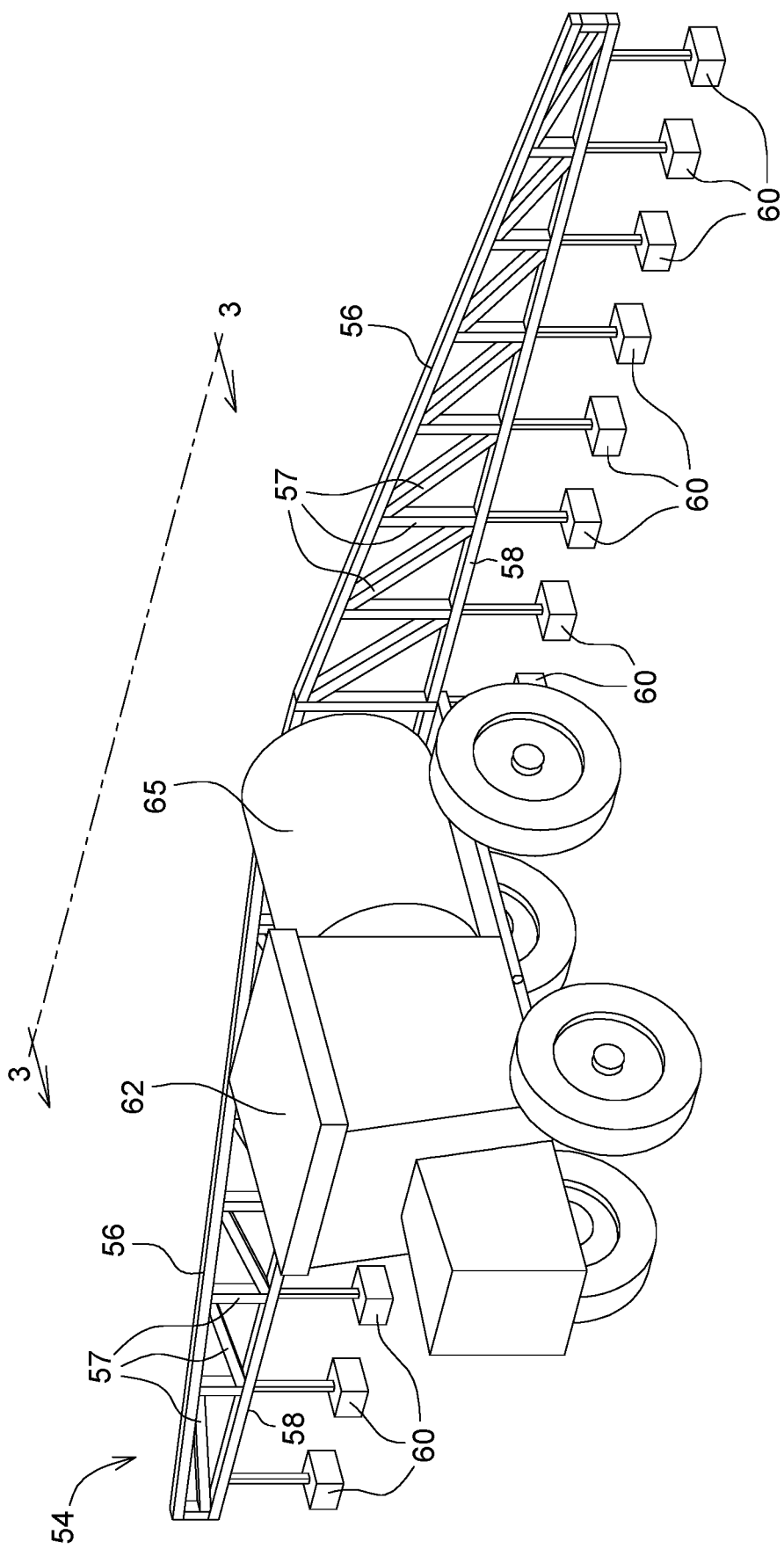
FIG. 2 is a perspective front view of an illustrative sprayer vehicle and implement that hosts the system of FIG. 1.

FIG. 2 is a perspective front view of an illustrative sprayer vehicle 61 and implement that hosts the system of FIG. 1. The sprayer vehicle 61 has a tank 65 or tows a trailer with a tank 65 thereon, where the tank 65 contains crop inputs for spraying or application to plants, soil, or the field. The sprayer vehicle 61 supports boom assembly 54. As illustrated in FIG. 2 and in FIG. 3, the boom assembly 54 comprises a lower boom member 58 and an upper boom member 56 that are connected via a boom braces 57. The boom assembly 54 supports one or more nozzle assemblies 60 or nozzle heads per row unit. For example, a primary nozzle assembly 60 is supported by the boom 54 to treat or spray a first row and a second row of crop, whereas a secondary nozzle assembly 60 is supported by the boom 54 to treat or spray a second row of crop and a third row of crop, where the nozzle control module 50 controls, separately and independently, or in synchronization or coordination, the primary nozzle assembly 60 and the second nozzle assembly 60 for the targeted application of crop inputs and coverage of the crop inputs. Each primary and second nozzle assembly 60 may contain one or more vertical arrays of nozzles. A first vertical array is defined by an array of left nozzles (222L, 224L, 226L), whereas a second vertical array of nozzles (222R, 224R, 226R) is defined by an array of second nozzles. The nozzle assemblies 60 are fed via supply lines (76, 64) that are connected or coupled to the tank 65 or a pump 92 associated with the tank 65 that contains material 101 or other crop input.

FIG. 3 is a rear view of the sprayer implement of FIG. 2 as viewed along reference line 2-2 of FIG. 2. FIG. 3 is similar to FIG. 2, except FIG. 2 shows the relation of respective nozzle assemblies 60 to corresponding plant rows (of plants or plants 66 (e.g., stems)) of the sprayer vehicle 61. Each nozzle assembly 60 has a vertical array of nozzles. As illustrated, each nozzle assembly 60 has a pair of lower nozzles (226L, 226R), a pair of intermediate nozzles (224L, 224R) and a pair of upper nozzles (222L, 222R). Each lower nozzle or pair of lower nozzles (226L, 226R) has a lower nozzle height 62. Each intermediate nozzle or pair of intermediate nozzles (224L, 224R) has an intermediate nozzle height 69. Each upper nozzle or pair of upper nozzles (226L, 226R) has an upper nozzle height 68.

FIG. 4 is an enlarged view of the rectangular region 4 in FIG. 3, where the region 4 includes a nozzle head or nozzle assembly 60. For each row unit, a vertical supply line 64 is connected to an input port of a manifold 214. Output ports of the manifold 214 are coupled to nozzles (222L, 224L, 226L, 222R, 224R, 226R) via nozzle actuators (44, 47, 148, 144, 147, 48), such as electrohydraulic valves, that control the flow (e.g., on or off, or volume and pressure) of fluid between the manifold 214 and the nozzles to produce a desired spray pattern or radiation pattern of one or more crop inputs. The nozzle actuators (44, 47, 148, 144, 147, 48) are associated with a communications and power lines that provide communications from the implement data processing system 42 and electrical energy to power the nozzle actuators (44, 47, 148, 144, 147, 48) and distance sensors (30, 130L, 130R) of each nozzle assembly 60. Fluid or liquid that contains, suspends or dissolves crop inputs are hydraulically communicated or conveyed from the tank 65 to the nozzles via the supply lines (64, 76) and manifold 214. As shown, the distance sensor comprises a right distance sensor (30 or 130R) and a left distance sensor (30 or 130L), where the left distance sensor 130L determines a left range or left distance between a left side of the nozzle assembly 60 and first plant row and wherein a right distance sensor (30 or 130R) determines a right range or right distance between a right side of the nozzle assembly 60 and a second plant row that is separated from the first plant row and adjacent to the first plant row. The second data processor 38 may use the right range or right distance and the left range or the left distance to estimate the lateral position of the row unit or nozzle assembly 60 between rows of plants; hence, adjust the control, selection or activation differentially of certain (pairs of) right and left nozzles to compensate for the lateral offset (of the nozzle assembly from a center point between adjacent rows of plants (166R, 166L)) and still deliver uniform spray pattern coverage (e.g., uniform dosing/application/concentration) of crop input to both rows of plants (e.g., with a spray pattern that uses different nozzles on the right and left sides of the nozzle assembly 60).

As illustrated in FIG. 4, the pair of upper nozzles comprises a left upper nozzle 222L and a right upper nozzle 222R, where the upper left nozzle 222L has a first down-tilt angle 431L and a right upper nozzle 222R has a first down-tilt angle 431R from a substantially vertical axis; the pair of intermediate nozzles comprises a left intermediate nozzle 224L and a right intermediate nozzle 224R, where the left intermediate nozzle 224L has a second down-tilt angle 433L and the right intermediate nozzle 433R has a second down-tilt angle 433R from a substantially vertical axis; the pair of lower nozzles comprises a left lower nozzle 226L and a right lower nozzle 226R, where the left lower nozzle 226L has a third down-tilt angle 435L from a substantially vertical axis and where the right lower nozzle 226R has a third down-tilt angle 435R from the vertical axis. In one embodiment, the first down-tilt angle is less than the second down-tilt angle. Further, the second down-tilt angle is less than the third down-tilt angle.

In one embodiment, the nozzle control module 50 is capable of selecting a new combination or permutation of nozzles of each nozzle assembly 60 for each time interval for substantial alignment with a dynamically adjustable target zone associated with corresponding plant row segments based on the observed position of the sprayer vehicle 61 in the field. As the sprayer vehicle 61 moves through the field, each nozzle assembly 60 or row unit faces a series of adjacent row segments with: (1) potentially different spacing or different lateral offset to the nozzle assembly 60 with respect to a center point or center line between adjacent plant row segments, (2) potentially different growth stages of plants or crop input requirements, (3) potentially different prescriptions for crop inputs based on zones. The second data processor 38 and the nozzle control module 50 can control, activate and deactivate nozzles of each nozzle assembly 60 on the boom 54 to provide the proper or appropriate customized application of crop inputs for each row segment, such as by directing, on a row-by-row basis, the spray pattern toward one or more left zones or rights zones on each side of the nozzle assembly 60. Within the left applicator 220L or vertical nozzle array of the nozzle assembly 60, a set of nozzle actuators (44, 47, 148) can selectively and independently actuate, control (e.g., volume and/or pressure) activate or deactivate any one or more nozzles, including any permutation of activated nozzles or deactivated nozzles or one or more corresponding intervals as the sprayer vehicle 61 moves or progresses through the field. Within the right applicator (220R) or vertical nozzle array of the nozzle assembly 60, a set of nozzle actuators can selectively and independently control actuate, activate or deactivate any one or more nozzles, including any permutation of activated nozzles or deactivated nozzles for an interval as the sprayer vehicle 61 progresses through a field with two or more rows.

The first nozzle actuator 44 can dynamically control, activate or deactivate the corresponding left upper nozzle 222L for one or more intervals in response to control signals or data from the nozzle control module 50 (or the second data processor 38) and position data from the location-determining receiver 10, consistent with: the target placement data 72, vehicle/implement data 64 and/or application rate data 70 for the applied or sprayed crop inputs. The second nozzle actuator 47 can control, activate or deactivate the corresponding left intermediate nozzle 224L for one or more intervals in response to control signals or data from the nozzle control module 50 (or the second data processor 38) and position data from the location-determining receiver 10, consistent with the target placement data 72, application rate data 70 and vehicle/implement data 64 for the applied or sprayed crop inputs. The third nozzle actuator 148 can control, activate or deactivate the corresponding left lower nozzle 226L for one or more intervals in response to control signals or data from the nozzle control module 50 (or the second data processor 38) and position data from the location-determining receiver 10, consistent with the target placement data 72, application rate data 70 and/or vehicle implement data 74 for the applied or sprayed crop inputs. The fourth nozzle actuator 144 can control, activate or deactivate the corresponding right upper nozzle 222R for one or more intervals in response to control signals or data from the nozzle control module 50 (or the second data processor 38) and position data from the location-determining receiver 10, consistent with the target placement data 72, application rate data 70, vehicle/implement data 74 for the applied or sprayed crop inputs. The fifth nozzle actuator 147 can control, activate or deactivate the corresponding right intermediate nozzle 224R for one or more intervals in response to control signals or data from the nozzle control module 50 (or the second data processor 38) and position data from the location-determining receiver 10, consistent with the target placement data 72, application rate data 70 and vehicle implement data 74 for the applied or sprayed crop inputs. The Nth nozzle actuator 48 (e.g., sixth nozzle actuator) can control, activate or deactivate the corresponding right lower nozzle 226R for one or more intervals in response to control signals or data from the nozzle control module 50 (or the second data processor 38) and position data from the location-determining receiver 10, consistent with the target placement data 72, application rate data 70, and vehicle/implement data 74 for the applied or sprayed crop inputs.

FIG. 5 illustrates a lateral separation or alignment of the nozzle assembly 60 to adjacent rows of plants (66, 166L, 166R) and target zones (e.g., target root zones) on the ground. The tank 65 in FIG. 5 contains fluid or liquid material 101, such as a crop input for spraying or application to crop, plants or the soil, or pests or weeds within the vicinity of the crop, plants or soil. The pump 92 in or external to the tank 65 is capable of pumping the fluid or liquid material 101 to the nozzle assembly 60 or nozzle head via a network of supply lines (76, 64).

A best illustrated in FIG. 5, the nozzles (222L, 224L, 226L, 222R, 224R, 226R) are directed toward different target zones or strips, which are associated with the ground near a left plant row and right plant row. However, in other configurations, it is understood that the nozzles (222L, 224L, 226L, 222R, 224R, 226R) can be configured to direct the target zones or strips at foliage above the ground. As shown in FIG. 5 the left nozzles (222L, 224L, 226L) are arranged in a vertical array comprising the left upper nozzle 222L at an upper height 68 above ground, a left intermediate nozzle 224L at an intermediate height 69 above ground, and a left lower nozzle 226L at a lower height 62 above ground. The left upper nozzle 222L has a first spray pattern 75 or an upper spray pattern directed at a left first zone 432L, which has the closest lateral offset 366 to the left plant row 166L. The left intermediate nozzle 224L has a second spray pattern 77 or an intermediate spray pattern directed at a left second zone 434L, which has an intermediate lateral offset to the left plant row 166L. The left lower nozzle 226L has a third spray pattern 79 or lower spray pattern directed at a third first zone 436L, which is closest to a central point between the two adjacent plant rows or which has the greatest lateral offset to the left plant row (e.g., a stem or trunk of one or more plants in the left plant row).

The implement data processing system 42 or the nozzle control module 50 selects or controls the appropriate or proper activation of one or more nozzles within the left array (222L, 224L, 226L) of the nozzle assembly 60 to cover any combination of one or more following zones: the left first zone 432L, the left second zone 434L or left intermediate zone, and the left third zone 436L, which may be based on an observed or measured distance between the left plant row and the nozzle assembly 60, or an observed or measured distance between the right plant row and the nozzle assembly 60, along with botany, plant science, agronomic data, agricultural prescriptions, or horticultural recommendations. For example, the crop input (e.g., fertilizer or soil treatment) may be targeted to a certain root zone of a treated plant or treated segment of the (left) crop row based on: the crop maturity level, crop height, the lateral width of the foliage, or lateral width leaf canopy of the crop row, as observed by sensors or input data entered by an operator of the sprayer vehicle 61.

As shown in FIG. 5 the right nozzles (222R, 224R, 226R) are arranged in a vertical array comprising the right upper nozzle 222R at a upper height 68 above ground, a right intermediate nozzle 224L at an intermediate height 69 above ground, and a right lower nozzle 226R at a lower height 62 above ground. The right upper nozzle 222R has a first spray pattern 75 or an upper spray pattern directed at a right first zone 432R, which has a closest lateral offset to the right plant row of plants 166R. The right intermediate nozzle 224R has a second spray pattern 77 or an intermediate spray pattern directed at a right second zone 434R, which has an intermediate lateral offset to the right plant row of plants 166R. The right lower nozzle 226R has a third spray pattern 79 or lower spray pattern directed at a third first zone 426R, which is closest to a central point between the two adjacent plant rows or which has the greatest lateral offset to the right plant row (e.g., a stem or trunk of one or more plants in the right plant row) of plants 166R. The implement data processing system 42 or the nozzle control module 50 selects or controls the appropriate or proper activation of one or more nozzles within the right array of the nozzle assembly 60 to cover any combination of one or more following zones: the right first zone 432R, the right second (or right intermediate) zone 434R and/or the right third zone 436R, which may be based on an observed or measured distance between the left plant row and the nozzle assembly 60, or an observed or measured distance between the right plant row and the nozzle assembly 60, along with botany, plant science, agronomic data, agricultural prescriptions or horticultural recommendations. For example, the crop input (e.g., fertilizer or soil treatment) may be targeted to a certain root zone of a treated plant 66 or treated segment of the (right) crop row based on: the crop maturity level, crop height or plant height 266, the lateral width of the foliage, or lateral width leaf canopy of the crop row, as observed by sensors or input data entered by an operator of the sprayer vehicle 61. Although FIG. 5 shows right nozzles (222R, 224R, 226R) in a vertical array, in alternate embodiments they may be in a substantially horizontal array, a diagonal array, or any other spatial relationship with each other so long as each discharges crop input, via a corresponding spray zone (e.g., spray zones, 75, 77 and 79), directed toward the right first zone 432R, right second zone 434R and right third zone 436R. Similarly, in alternate embodiments, the left nozzles (222L, 224L, 226L) may be arranged in substantially horizontal array, a diagonal array, or any other spatial relationship with each other such that the crop inputs are directed toward the left first zone 432L, left second zone 434L and left third zone 436L.

As used in this document, the first zone may refer to the left first zone (432L), the right first zone (432R) or both; second zone may refer to the left second zone (434L), the right second zone (434R), or both; the third zone may refer to the left third zone (436L), the right third zone (436R), or both. The zones may be altered by changing the down-tilt angles (431L, 433L, 435L, 431R, 433R, 435R) or other compound angles that define the direction that the crop input leaves each nozzle. For example, the operator can manually reduce the down-tilt of one or more nozzles in the nozzle assembly 60 to treat or spray the foliage of one or more segments of plant rows in accordance with a treatment plan for fungicide, pesticide, insecticide or herbicide.

Figure 6:
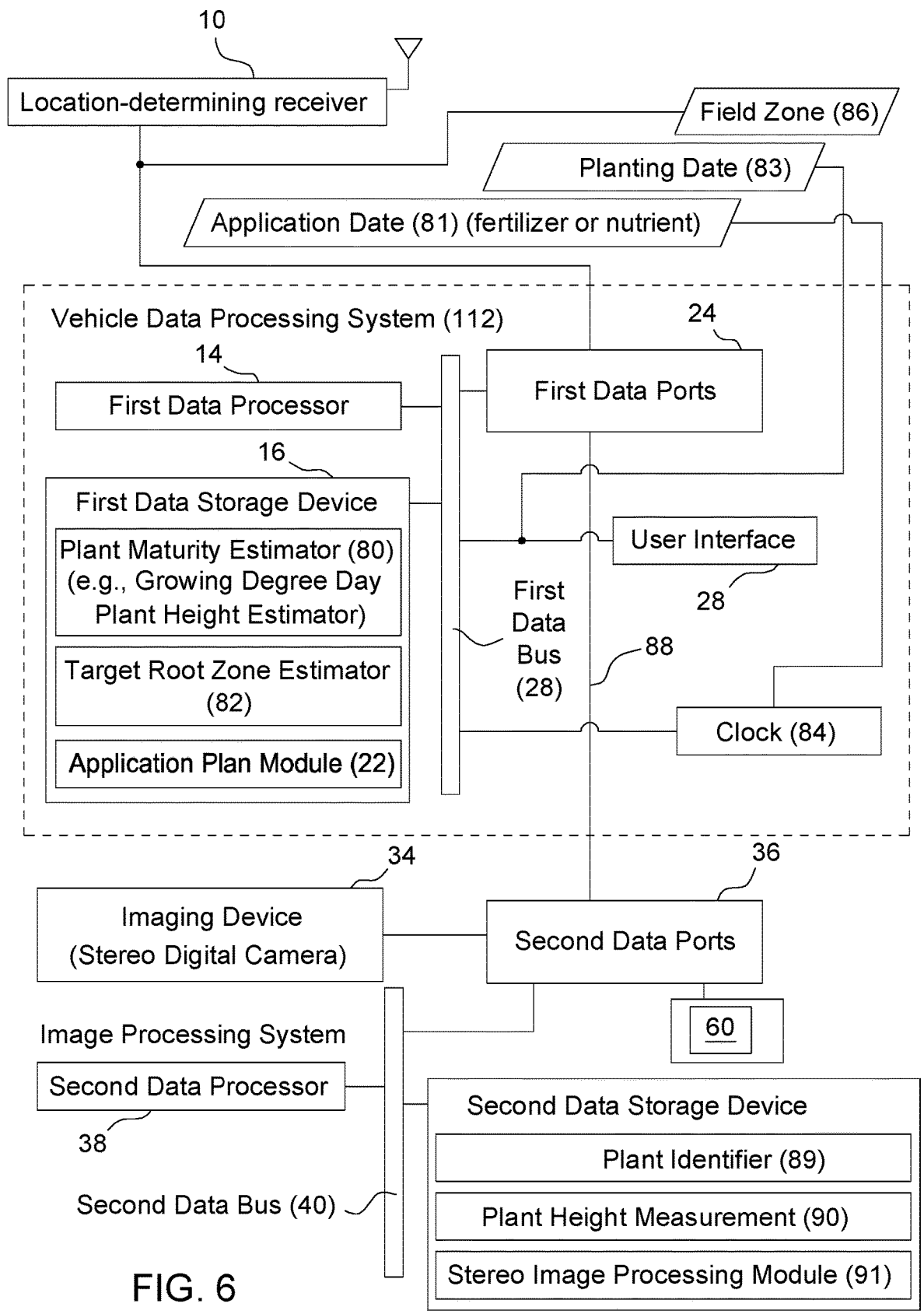
FIG. 6 is an alternate embodiment of a block diagram of a system for spraying plants.

FIG. 6 is an alternate embodiment of a block diagram of a system for spraying plants. The system of FIG. 6 is similar to the system of FIG. 1, except that the vehicle data processing system 12 further comprises plant maturity estimator 80, target root zone estimator 82, and a clock 84, along with the data references to the application date 81, and planting date 83. Like reference numbers in FIG. 1 and FIG. 6 indicate like features or elements.

FIG. 6 further comprises an optional imaging device 34 (e.g., stereo imaging device) and other optional modules related to the imaging device 34, such as a plant identifier 89 module, a plant height measurement 90 module and an image processing module 91 (e.g., stereo image processing module). The imaging device 34 and modules are indicated as optional by the dashed lines and will be described later in this document.

In FIG. 6, the user interface 28 allows the user to enter, download or input information about the planted crop or seeds to establish a planting date 83 for the crop in a particular field. The first data processor 14 receives the input about the planting date 83 from the user interface 28 and the current date from the clock 84 or user interface 28 to estimate the number of days or corresponding maturity state of the planted crop. For example, the plant maturity estimator 80 estimates growing degree days of the crop based on the field zone 86 or agricultural region in which the particular field is located by observing coordinates of the location-determining receiver 10 or user input into the user interface 28 that indicates the field location or field zone 86. In one embodiment, the vehicle data processing system 12 may obtain or use the application date 81 of fertilizer or nutrient entered by an operator via the user interface 28. In another embodiment, to enhance the accuracy of the plant maturity estimate determined by the plant maturity estimator 80, the vehicle data processing system 12 or plant maturity estimator 80 may use or obtain local historical precipitation, rainfall, or other historical weather data from commercially available sources accessed through a wireless network, an electronic communications network or on the Internet via a wireless communications device (e.g., wireless transceiver, cellular phone, satellite phone or smartphone) coupled to the first data ports 24.

In one embodiment, the target root zone estimator 82 provides a root zone or target zone for crop inputs at, near or around the plant rows based on one or more of the following plant data: estimated plant height, observed or measured plant height, estimated plant maturity, observed plant maturity, estimated drip line of the plant or plant row, estimated lateral width of the plant or row segment, or observed lateral width of the plant or row segment to be treated. For example, in one embodiment, the target root zone estimator 82 provides a recommended zone, among the first zone (432L, 432R), the second zone (434L, 434R) or the third zone (436L, 436R), for each corresponding segment of a plant row consistent with the plant maturity or other plant data output of the plant maturity estimator 80 that is correlated to plant maturity.

In one embodiment, the optional plant identifier module 89, the optional plant height measurement module 90 and a stereo image processing module 91 receive data, such as image data (e.g., stereo image data) of plant rows from the imaging device 34. The optional plant identifier 89 module compares reference images of reference plants or reference foliage stored in the second data storage device 46 or elsewhere to observed images of plants or foliage in one or more plant rows to identify the crop type, species or variety and to estimate the crop maturity. For example, the reference images may comprise plants at various reference growth stages in accordance with established, recognized or generally accepted plant maturity levels. The reference images may be stored in the form of raw images, normalized images, a list of plant parameters, a neural network, or any other suitable format.

In one embodiment, the plant height measurement module 90 estimates a plant height of an observed crop based on collected stereo image data in conjunction with the image processing module 91 (e.g., stereo image processing module). First, the image processing module 91 may use color differentiation to distinguish plant pixels from background images (e.g., soil, sky or weeds) in the collected image data. For example, the second data storage device 46 contains reference plant pixels colors or a reference range of potential plant pixel colors for comparison to collected image data. Second, the image processing module 91 may establish a constellation of plant pixels and a boundary region between plant pixels and background pixels. For example, the boundary region may represent a substantially linear or curved line near at the vertical limit or top of a plant or row. Third, the observed three dimensional coordinates of the collected image data in the boundary region are converted to real world coordinates to estimate a plant height 266 of plant or segment of a row of plants.

The system disclosed in this document is well-suited for selecting or controlling vertical position of active nozzles to provide desired application of crop input to one or more target zones on the soil, and/or vegetation. Further, the system can adjust the spray pattern for each crop row independently and dynamically to select a different spray pattern for each time interval and for each respective crop row segment of any crop row or set of crop rows. The system can be configured to adjust the spray patterns for each crop row segment based on observed or measured lateral spacing within each row to compensate for as-planted variation or error in crop row spacing, such as variation associated with manual driving during planting or from use of satellite navigation service or satellite navigation receivers that do not feature the latest technology in precise positioning.

While the disclosure has been described in detail in the drawings and foregoing description, the description shall be considered as exemplary and illustrative, rather than restrictive of the scope of protection set forth in the claims. Various illustrative embodiments have been shown and described in this document, such that any changes, variants and modifications that come within the spirit of the disclosure will fall within the scope of the disclosure and its associated claims.

The following is claimed:

1. A system for spraying plants, the system comprising:
a location-determining receiver for estimating a position of a sprayer with respect to one or more rows of plants;
an implement extending laterally from the sprayer and configured to be over some rows of the plants of a row crop;
a plurality of spraying row units spaced laterally apart from each other on the implement;
a nozzle assembly of each of the row units supported by, or suspended from, the implement of the sprayer, the nozzle assembly comprising a first nozzle with a greater height above ground than a second nozzle;
a distance sensor associated with each of the corresponding row units, the distance sensor configured to measure a distance between the nozzle assembly of its corresponding row unit and a plant row segment that the distance sensor faces to control independently, of other row units, the nozzle assembly for its corresponding row unit based on the measured distance; the first nozzle directed toward a first zone with a respective first lateral spacing with respect to the plant row segment based on a spray pattern of the first nozzle; the second nozzle directed toward a second zone with a respective second lateral spacing with respect to the plant row segment based on a spray pattern of the second nozzle, where the first lateral spacing is different than the second lateral spacing; and
a nozzle control module adapted to select or to activate one or more of the nozzles of the nozzle assembly of ones of the row units to cover the first zone, the second zone, or both as a target zone for the plant row segment based on the measured distance consistent with the first lateral spacing and the second lateral spacing to compensate for as-planted variation or error in crop row spacing of the plants; and
a data processor capable of communication with the guidance module; and a user interface coupled to the data processor, the user interface supporting input of a sprayer make and model number that is associated with observed height information of one of the first nozzles and one of the second nozzles with respect to the ground.

2. The system according to claim 1 wherein the first nozzle comprises an upper nozzle at an upper height above the ground and wherein the second nozzle comprises an intermediate nozzle at an intermediate height above the ground.

3. The system according to claim 2 wherein the upper nozzle directed at a first down-tilt angle with respect to the vertical axis and wherein the intermediate nozzle is directed at a second down-tilt angle with respect to a vertical axis toward the second zone.

4. The system according to claim 2 further comprising a lower nozzle at a lower height above ground below the intermediate nozzle, wherein the lower nozzle is directed at a third down-tilt angle with respect to a vertical axis toward a third zone.

5. The system according to claim 1 wherein the first nozzle comprises a pair of upper nozzles on the row unit facing opposite directions toward a left first zone and a right first zone associated with adjacent rows of plants.

6. The system according to claim 1 wherein the distance sensor further comprising:
a pair of distance sensors, comprising the distance sensor, on the row unit facing opposite directions toward adjacent rows of plants;
wherein the data processor is to determine a lateral offset of the nozzle assembly with respect to adjacent rows to facilitate selection of the one or more nozzles by the nozzle control module in substantial alignment with the target zone.

7. The system according to claim 1 wherein the nozzle control module is capable of selecting a new combination or permutation of nozzles for each time interval for substantial alignment with a dynamically adjustable target zone associated corresponding plant row segments based on an estimated position of the sprayer in the field, where the sprayer comprises a vehicle.

8. The system according to claim 1 wherein a secondary nozzle assembly is associated with a secondary row unit supported by the implement, the secondary nozzle assembly having nozzles arranged in a vertical array, wherein the nozzle control module controls secondary nozzle assembly independently from said other nozzle assembly.

9. The system according to claim 1 wherein the distance sensor comprises one or more of the following: laser range finder, an ultrasonic range detector, and stereo imaging device associated on the sprayer or implement.

10. The system according to claim 1 further comprising:
a plurality of nozzle assemblies located beneath or lower than a boom of the implement, each one of the nozzle assemblies comprising the first nozzle that is controlled by a first nozzle actuator and the second nozzle that is controlled by a second nozzle actuator; and
a plurality of distance sensors, where each distance sensor is mounted on corresponding ones of the nozzle assemblies.

11. The system according to claim 1 further comprising:
a data bus coupled to the data processor;
a data storage device coupled to the data bus;
a guidance module adapted to align the row unit with a target path between the rows of plants, wherein the guidance module is storable in the data storage device.

12. A system for spraying plants, the system comprising:
a location-determining receiver for estimating a position of a sprayer with respect to one or more rows of plants, comprising plant row segments;
a row unit supported by or suspended from an implement of the sprayer; a pair of distance sensors on the row unit facing opposite directions from each other, each distance sensor configured to measure a distance between the row unit and a proximate plant portion of a corresponding plant row segment that each distance sensor faces;
a pair of first nozzles associated with the row unit, the first nozzles having corresponding first outlets facing different or opposite directions, each of the first nozzles directed toward a first zone with respect to the proximate plant portion of a corresponding plant row segment based on a first spray pattern of each first nozzle, the pair of first nozzles positioned above a pair of second nozzles in respective vertical arrays;

the pair of second nozzles associated with the row unit, the pair of second nozzles having corresponding second outlets facing different or opposite directions, each of the second nozzles directed toward a second zone with respect to the proximate plant portion of a corresponding plant row segment based on a second spray pattern of the second nozzle;

a nozzle control module adapted to select or activate any two of the nozzles of a nozzle assembly comprising the pair of first nozzles and the pair of second nozzles based on maximum coverage of a target zone around the proximate plant portion of the one or more row segments based on the first zone, the second zone, and the measured distance or measured distances; a first data processor capable of communication with a guidance module; and a user interface coupled to the first data processor, the user interface supporting input of a sprayer make and model number that is associated with observed height information of one of the first nozzles and one of the second nozzles with respect to the ground.

13. The system according to claim 12 wherein a target path of the sprayer comprises a centered path between adjacent ones of the rows where distances measured by the pair of distance sensors are approximately equal and wherein the nozzle control module selects or activates the pair of first nozzles or the pair of the second nozzles.

14. The system according to claim 12 wherein a target path comprises an offset path between adjacent ones of the rows where distances measured by the pair of distance sensors are different by at least a minimum threshold and wherein the nozzle control module selects or activates one of the first nozzles and one the second nozzles, such that different zones are substantially targeted for adjacent rows of the plants.

15. The system according to claim 14 further comprising: a plurality of row units, each of the row units having corresponding pairs of the first nozzles and the second nozzles, and having a corresponding pair of distance sensors;

wherein the nozzle control module is adapted to select or activate nozzles on the row units independently from the other row units based on the measured distances from the corresponding pair of distance sensors and based on the location of the sprayer in the field.

16. The system according to claim 15 wherein the nozzle control module is adapted to select or control the nozzles on the row unit such that there is compensation for growth variation in the rows of plants or variation in the as-planted spacing between adjacent rows of plants.

17. The system according to claim 12 wherein the proximate plant portion comprises a closest or nearest plant stem in a row of crop.

18. The system according to claim 12 wherein the first zone and second zone comprise adjacent bands or strips on the ground near the proximate plant portion.

19. The system according to claim 12 wherein there is no or minimal overlap between the first zone and the second zone.

20. The system according to claim 12 further comprising: a guidance module adapted to align the row unit with a target path between the rows of plants, the first data processor capable of communication with the guidance module;

wherein the user interface supports entry of the crop input, indicative of whether the crop input comprises a nutrient or a non-nutrient application, where the target zone for nutrient crop inputs is directed toward a ground zone with reference to the plant stem and wherein the target zone for non-nutrient crop inputs is directed toward a foliage zone with respect to the plant stem or plant foliage.

21. The system according to claim 12 further comprising: a guidance module adapted to align the row unit with a target path between the rows of plants, the first data processor capable of communication with the guidance module; and wherein the user interface supports entry of the average, median, or mean plant height in a row, field or zone of crop, or the average, median or mean lateral width or span of the leaf canopy of the plant in a row, field or zone of crop.

22. The system according to claim 12 wherein a first distance sensor on a first side of the row unit estimates a first estimated distance between the row unit and a first plant or first row of plants, wherein a second distance sensor, on a second side of the row unit opposite the first side, estimates a second estimated distance between the row unit and second plant or second row of plants; and wherein the nozzle control module is adapted to select different ones of the nozzles, on opposite sides of the row unit if the first estimated distance differs from the second estimated distance.

23. The system according to claim 12 further comprising: a plant height sensor or imaging device for estimating a height of the plants in plant rows, which can be assigned one or more corresponding target zones or foliar target zones;

the nozzle control module selects the nozzle based on at least one of the measured distance, an observed height of the nozzle with respect to ground, the observed position of the sprayer vehicle, and any offset between the nozzle head with respect to a target path between the rows of plants.

24. The system according to claim 12 wherein the nozzle control module is arranged to reduce the lateral width of the spray pattern on demand for a particular crop row segments with narrower than targeted row spacing to provide uniform application of fertilizer to crop rows or to apply fertilizer in accordance with differential application requirements.

25. The system in accordance with claim 24 wherein the nozzle control module is adapted to select a target zone spaced further from a corn or maize plant or with a lateral offset to a root zone during a certain growth stage of the maize or corn plant for application of the fertilizer.

26. The system according to claim 12 wherein the nozzle control module is adapted to reduce dynamically the lateral width of the spray pattern on demand to avoid overspray or unwanted application of fertilizer, unwanted application of herbicide, or crop inputs that might damage crops or other vegetation based on change in heading or accelerometer indicative of a turn of the sprayer vehicle.

* * * * *